(12) United States Patent
Buck

(10) Patent No.: US 6,845,627 B1
(45) Date of Patent: Jan. 25, 2005

(54) CONTROL SYSTEM FOR AN AIRCRAFT GALLEY COOLER

(75) Inventor: Gilbert W. Buck, Mission Viejo, CA (US)

(73) Assignee: BE Intellectual Property, Inc., Wellington, FL (US)

(*) Notice: Subject to any disclaimer, the term of this patent is extended or adjusted under 35 U.S.C. 154(b) by 0 days.

(21) Appl. No.: 10/705,203

(22) Filed: Nov. 10, 2003

(51) Int. Cl.⁷ .............................................. B60H 1/32
(52) U.S. Cl. ........................ 62/185; 62/126; 62/130; 62/213; 62/239; 62/237; 165/919
(58) Field of Search ........................ 62/126, 127, 129, 62/130, 185, 201, 213, 180, 186, 208, 237, 239, 229, 430, 434, 435, 448; 165/918, 919

(56) References Cited

U.S. PATENT DOCUMENTS

| | | | |
|---|---|---|---|
| 2,779,171 A | | 1/1957 | Lindenblad |
| 3,216,215 A | | 11/1965 | Schuett |
| 4,432,210 A | * | 2/1984 | Saito ........................... 62/126 |
| 4,890,463 A | | 1/1990 | Cantoni |
| 4,936,105 A | * | 6/1990 | Takechi et al. ................ 62/129 |
| 5,052,472 A | | 10/1991 | Takahashi et al. |
| 5,115,643 A | * | 5/1992 | Hayata et al. ................ 62/126 |
| 5,265,437 A | | 11/1993 | Saperstein et al. |
| 5,369,960 A | | 12/1994 | Mueller et al. |
| 5,491,979 A | | 2/1996 | Kull et al. |
| 5,496,000 A | | 3/1996 | Mueller |
| 5,513,500 A | | 5/1996 | Fischer et al. |
| 6,014,866 A | | 1/2000 | Durham |

* cited by examiner

Primary Examiner—Harry B. Tanner
(74) Attorney, Agent, or Firm—Fulwider Patton Lee & Utecht, LLP

(57) ABSTRACT

An aircraft galley air cooling system utilizes a controller having software for regulating the temperature within food carts within a galley air cooling unit. The cooling unit includes supply air and return air temperature sensors which measure the temperature of the air entering and exiting the food cart. The return air temperature is regulated by controlling the amount of a liquid refrigerant that flows through a heat exchanger within the cooling unit. If the return air temperature sensor fails, then the controller regulates the supply air temperature. The controller also regulates defrosting of the cooling unit.

17 Claims, 11 Drawing Sheets

CONTROL SYSTEM FOR AN AIRCRAFT GALLEY COOLER

BACKGROUND OF THE INVENTION

1. Field of the Invention

This invention relates to transport aircraft galley systems, and more particularly, to control systems for cooling food carts within the galley system.

2. Description of Related Art

Aircraft galley systems for modern transport aircraft incorporate food carts which are cooled to prevent food spoilage prior to use by the cabin attendants for distribution of food to the passengers. These food carts have in the past been interfaced with cold air supply systems in the galley designed to cool the interiors of the food carts. Such cool air distribution systems were generally co-located with the balance of the galley and interface to the food carts by means of gaskets connecting the food carts to a plenum containing the cool air.

As space in modern aircraft cabins has become more at a premium and more efficient means of cooling the carts has become necessary, a need for alternatives to such systems emerged. Thus, it has become more desirable to remove refrigeration equipment from the galley compartment and to find other means to properly cool the food carts without locating the entire refrigeration system in the galley area. Furthermore, FDA rulings lowered the required temperature at which the interior of the food carts must be kept to prevent food spoilage. It is important that any system that interfaces with either food or the cabin area can be configured to provide a wide range of cooling capacity.

Such cooling systems require control systems to maintain temperatures within the food carts within precise limits to prevent food spoilage or freezing. The present invention satisfies these and numerous other requirements for transport aircraft.

SUMMARY OF THE INVENTION

The present invention overcomes the shortcomings of previously known systems for cooling food carts in aircraft. In general terms, the invention includes a method for regulating the air temperature in a food cart within an aircraft galley system. The galley system includes a galley air cooling unit which has therein the food cart and a galley plenum. The plenum includes a heat exchanger and a fan. The fan blows air across the heat exchanger, into the food cart via an air supply duct coupling the plenum to the food cart and back into the plenum via an air return duct coupling the food cart to the plenum. An air supply temperature sensor measures the temperature of the air entering the food cart from the plenum, and an air return temperature sensor measures the temperature of the air entering the plenum from the food cart. The galley air cooling unit may also include a galley air cooling unit switch for turning the galley air cooling unit on, a proximity switch which indicates the presence of a food cart within the galley air cooling unit, and a liquid refrigerant indicator which indicates whether the liquid refrigerant is sufficiently cool to regulate the air temperature in the galley air cooling unit. The method of the invention utilizes a control system for performing various steps.

In one embodiment of the invention, the method includes regulating the return air temperature to a selected set point by controlling, via a valve, the amount of a liquid refrigerant flowing through the heat exchanger. The method also includes regulating the supply air temperature if the return air temperature sensor fails. Regulating the supply air temperature including regulating the supply air temperature between a preset bottom threshold and a preset top threshold, closing the valve completely if the supply air temperature falls below the preset bottom threshold, opening the valve when the supply air temperature rises to the preset top threshold and resuming regulation of the supply air temperature between the preset bottom threshold and the preset top threshold. The method further includes temporarily discontinuing regulation of the return air temperature if the supply air temperature drops below the preset bottom threshold. Temporarily discontinuing regulation of the return air temperature includes closing the valve completely until the supply air temperature increases to the preset top threshold and resuming regulation of the return air temperature.

The method of the invention further includes regulating the valve and turning the fan on if certain conditions are met. The conditions which must be met are: (1) the galley air cooling unit switch is ON; (2) the proximity switch indicates that a food cart is within the galley air cooling unit; and (3) either the liquid refrigerant indicator indicates that the liquid refrigerant is sufficiently cool to regulate the air temperature in the galley air cooling unit or the liquid refrigerant is at least 2° C. (4° F.) below the selected set point. Similarly, the method of the invention includes closing the valve and turning the fan off if any of the following conditions are met: (1) the galley air cooling unit switch is turned OFF; (2) the proximity switch indicates that there is not a food cart within the galley air cooling unit; or (3) both the liquid refrigerant indicator indicates that the liquid refrigerant is not sufficiently cool to regulate the air temperature in the galley air cooling unit and the liquid refrigerant is at least 6° C. (10° F.) above the selected set point.

The method may also include defrosting the galley air cooling unit following the expiration of a first preset duration of time when the air temperature in the galley air cooler is being regulated to the selected set point. Defrosting the galley air cooling unit includes closing the valve, leaving the valve closed for a second preset duration of time if the temperature of the heat exchanger fails to reach a preset upper temperature threshold, and leaving the valve closed for an additional duration of time after the temperature of the heat exchanger reaches the preset upper temperature threshold if the preset upper temperature threshold is reached prior to the expiration of the preset duration of time, and resuming regulation of the air temperature in the galley air cooling unit to the selected set point.

In one embodiment of the invention, the method includes defrosting the galley air cooling unit following the expiration of about thirty minutes, the valve is left closed for about nine minutes if the temperature of the heat exchanger fails to reach about 2° C. (36° F.), and the valve is left closed for an additional duration of about five minutes after the temperature of the heat exchanger reaches about 2° C. (36° F.). However, in another embodiment of the invention, the method includes defrosting the galley air cooling unit following the expiration of about forty minutes, the valve is left closed for about twelve minutes if the temperature of the heat exchanger fails to reach about 7° C. (44° F.), and the valve is left closed for an additional duration of about two minutes after the temperature of the heat exchanger reaches about 7° C. (44° F.). Defrosting the galley air cooling unit may include turning the fan off at intervals of about every three minutes for about twenty seconds while defrosting the galley air cooling unit. The method may also include ending defrosting if the galley air cooling switch is transitioned to OFF while defrosting the galley air cooling unit. Defrosting may also be ended if the proximity switch indicates that there is not a food cart within the galley air cooling unit while defrosting the galley air cooling unit.

In one embodiment of the invention, the method includes turning the fan on when the galley air cooling unit switch is transitioned to ON, running the fan for a preset duration of time, such as about thirty seconds, after the galley air cooling unit switch is transitioned to ON, turning the fan off if the galley air cooling unit switch is transitioned to OFF prior to the expiration of the preset duration of time, and opening the valve partially at the expiration of the preset duration of time if the galley air cooling unit switch remains in the ON position.

The valve may electronically controlled such that the valve opens further as the voltage level feeding the valve increases until the valve is fully open. In such a configuration, the allowable voltage feeding the valve is regulated by pulse width modulation settings which have a control range. In one embodiment of the invention, the method includes opening and closing the valve at a maximum rate of about 10% per second of the pulse width modulation control range. Opening the valve to a fully open condition may include applying about 90% of the allowable voltage to the valve and closing the valve to a fully closed condition may include applying about 20% of the allowable voltage to the valve.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
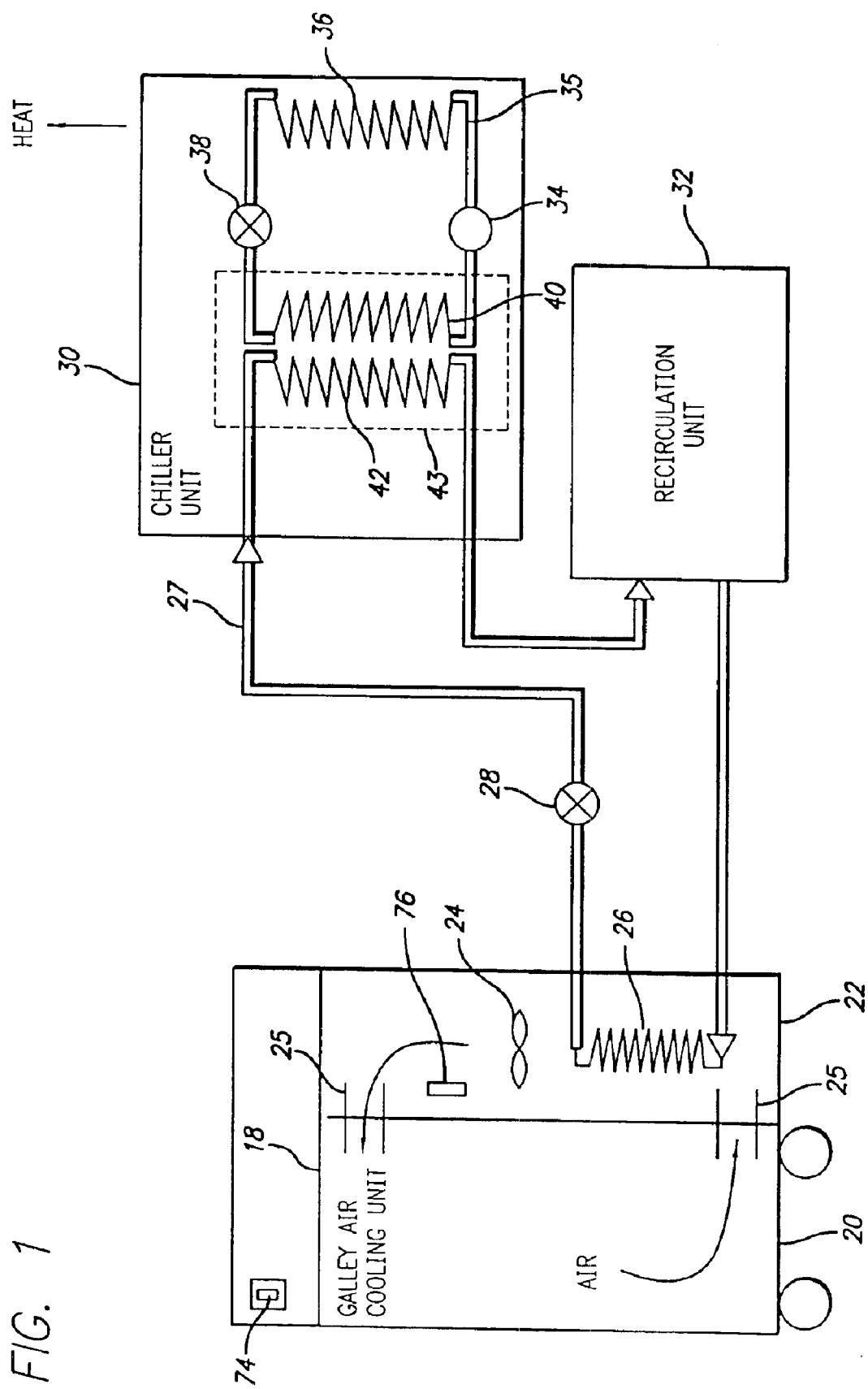
FIG. 1 is a schematic diagram illustrating a general overview of the galley refrigeration system for aircraft according to the invention.

The present invention is directed to a control system for an aircraft galley air, cooling unit for refrigerating removable food carts within the galley. Generally, the system for refrigerating food carts is a liquid chiller system. The liquid chiller system may be an aircraft-mounted distributed thermal management system that provides cooled, dehumidified air to galleys distributed throughout the aircraft. The food carts are used to store food for passengers and are controlled within precise temperature limits to prevent food spoilage or freezing.

More specifically, the present invention includes an electronic control system for monitoring and controlling three distributed refrigeration subsystems of the liquid chiller system. The first refrigeration subsystem includes at least one remote chiller, the second refrigeration subsystem includes at least one galley air cooling unit, and the third refrigeration subsystem includes at least one recirculation unit.

The main function of the liquid chiller system is to provide regulated air temperatures, which in one embodiment of the invention are nominally between $-1°$ and $16°$ C. ($31°$ F. and $61°$ F.) within the food cart system. General types of food cart systems in use include: air-through food carts, where the air flows through each food cart independently; and air-over food carts, where air flows into a closed compartment containing multiple food carts. The liquid chiller system may also provide condensation drainage from the galley air cooling units and incorporate features to prevent excessive frost accumulation on heat exchangers within the galley air cooling units.

Each remote chiller constitutes a self-contained refrigeration unit, which serves to remove heat from a liquid refrigerant, referred to as the intermediate working fluid. The intermediate working fluid is then distributed to the at least one galley air cooling unit. In air-through ("AT") galleys, the galley air cooling units each include a food cart and a galley plenum. The chilled intermediate working fluid is distributed into and exits from a heat exchanger within the galley plenum. A fan within the plenum blows air-over the exchanger and through the food cart such that heat absorbed by the air within the food cart is transferred to the chilled intermediate working fluid. In this manner, the food cart may be continually flushed with air chilled by the galley plenum heat exchanger. Modulating the flow rate of the intermediate working fluid through the heat exchanger controls the temperature of the cooling air supplied to each food cart, thereby providing a regulated cold air temperature.

Upon exiting the galley plenum the intermediate working fluid is distributed to the at least one recirculation unit. Each recirculation unit may include one or more liquid pumps and expansion tank or accumulator. The one or more pumps of the recirculation units pressurize the intermediate working fluid for redistribution to the remote chillers. The accumulators of the recirculation units allow for the storage and thermal expansion of the intermediate working fluid. In one embodiment of the invention, the recirculation unit is equipped with two pumps, one that is an active operational pump, and one that is a backup pump. Control logic in the recirculation unit alternates between each pump during specific conditions, thereby balancing the usage between the pumps.

The control system may monitor and control individual components of each refrigeration subsystem. Individual electronic devices may be used to monitor and control the temperature within each food cart. The galley air cooling units may include a control valve to vary the amount of liquid refrigerant entering the galley plenum. The electronic devices monitoring the temperature of the air in the food cart may be used to adjust the control valve. These same electronic devices may also be used to turn the fan in the galley plenum on and off.

Other electronic devices may be used to monitor and control the recirculation units. These electronic devices may also be configured to monitor the pressure and volume within the expansion tank. The recirculation units may be controlled by turning the pumps on and off or by varying the speeds at which the pumps operate.

Other electronic devices may also be used to monitor and control the remote chillers. By monitoring the pressure and temperature within the remote chiller the electronic devices can appropriately determine which remote chillers to operate at any given time.

The entire system and each individual component should be configured for operation within the unique environment presented by transport aircraft. Equipment used on commercial aircraft must meet strict requirements. In addition to maintaining food at safe temperatures, general aircraft operating requirements must be met.

As depicted in FIG. 1, several components combine to form a galley air cooling unit 18. A food cart 20 is typically stored within a galley plenum 22 while storing food. To safely store the food, the air within the food cart must be stored at or below a specific temperature. For example, 4° C. (39° F.) is the temperature required by certain agencies. The galley plenum is equipped with gaskets to form an air tight seal with the food cart. The galley plenum may be equipped with a fan 24 which circulates air-throughout the food cart and over at least one heat exchanger 26 within the galley plenum. Ducts 25 between the food cart and the galley plenum direct the flow of air across the stored food.

The heat exchanger 26 within the galley plenum 22 may include a plate and fin configuration optimized for removing heat from passing air. The heat exchanger 26 provides for the exchange of thermal energy between ambient air and a liquid refrigerant, also referred to as a heat transfer fluid, or the intermediate working fluid 27. A known heat transfer fluid having appropriate thermal and physical properties for use with the present invention is a fluorinated heat transfer fluid sold under the trademark GALDEN® HT 135. GALDEN® HT 135 is a perfluoropolyether or PFPE fluid sold by the Ausimont Montedison Group, although other similar heat transfer fluids may also be suitable.

A large number of the food carts 20 may be required on a single aircraft. In one embodiment, each food cart may require a thermal exchange of approximately 750–1000 BTUs per hour. The corresponding air flow requirement of each food cart in such an arrangement would then be approximately 72 cubic feet per minute. The corresponding fluid flow through each heat exchanger 26 would be approximately 0.64 gallons per minute (using GALDEN® HT 135). Control Systems in accordance with the present invention may be designed to meet these requirements for as many food carts as are used on an aircraft.

A coolant control valve (CCV) 28, such as a proportional flow valve, may be used to control the flow of the intermediate working fluid 27 from each heat exchanger 26 within the galley plenum 22. It is also contemplated that a single coolant control valve may control the flow of fluid into two or more heat exchangers. One method of controlling the temperature of the air within the food cart 20 is to electronically manipulate the coolant control valve via the control system so as to regulate the flow of fluid into the heat exchanger.

As depicted in FIG. 1, the source of the chilled intermediate working fluid is at least one remote chiller unit 30.

After exiting the heat exchanger 26 within the galley plenum 22 the intermediate working fluid is no longer chilled. The unchilled intermediate working fluid is returned to the chiller unit via the valve 28, cooled, and redistributed throughout the system by at least one recirculation unit 32.

Figure 2:
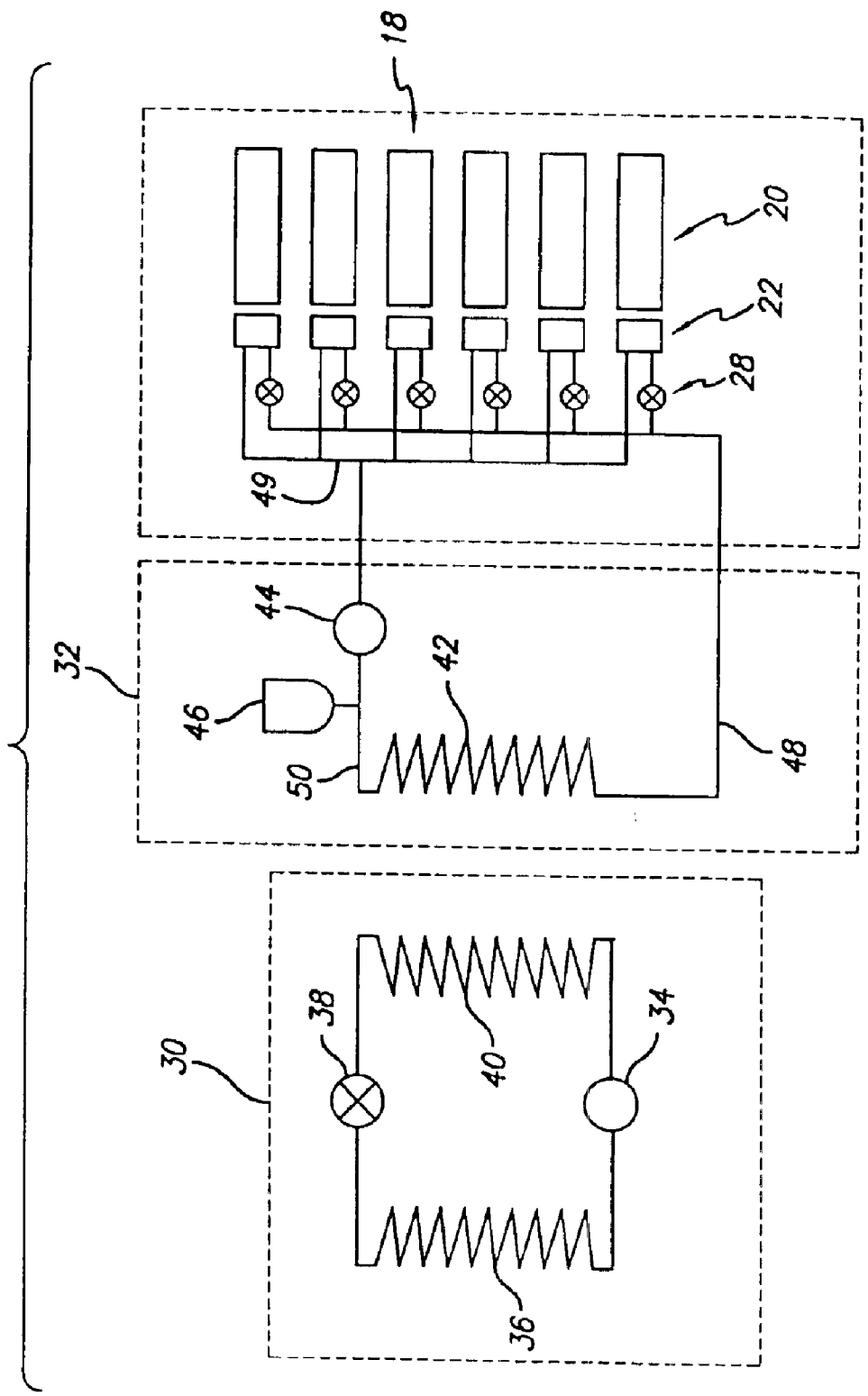
FIG. 2 is a schematic diagram illustrating the general design parameters of the galley refrigeration system for aircraft according to the invention.

As depicted schematically in FIG. 2, a simple galley air cooling unit system may include a remote chiller unit 30 and a recirculation unit 32 refrigerating several food carts 20. As an example, the liquid chiller system may be configured as a vapor cycle refrigeration unit. In such a unit, a compressor 34 (a pump or other machine that increases the pressure of a gas) may be powered by the aircraft's electrical system. A rotary-type compressor may be used to compress low temperature and pressure vapor into high temperature and pressure super-heated vapor. The material to form this vapor is also a refrigerant and may be referred to as a chiller working fluid 35 (See FIG. 1). A known material which has appropriate thermal and physical properties for use in the galley air cooling unit as the chiller working fluid is a hydrofluorocarbon refrigerant such as that sold under the name HFC-134a available from DuPont, or sold under the name MEFOREX 134a, or HT 134a, available from Ausimont, as a replacement for CFC12, although other similar refrigerants may also be suitable.

From the compressor 34, the chiller working fluid 35 flows into a condenser 36. The condenser may be configured as a tube-fin heat exchanger to maximize heat rejection. From the condenser, the chiller working fluid flows through an expansion valve 38 into an evaporator 40. The evaporator may be configured as a plate-fin heat exchanger to maximize heat absorption.

Associated with the evaporator 40 is an expelling heat exchanger 42. The intermediate working fluid 27 flows through the expelling heat exchanger. The association of the evaporator with the expelling heat exchanger forms a chiller unit heat exchanger 43 (see FIG. 1) and enables a thermal exchange between the intermediate working fluid and the chiller working fluid 35 without the fluids ever mixing. As the chiller working fluid passes through the evaporator 40, back into the compressor 34, it draws heat from the expelling heat exchanger and the intermediate working fluid.

A remote chiller unit 30 may be required to maintain a required low temperature in several food carts 20. As an example, the total heat rejection required of a single remote chiller unit may be about 18,000 BTUs per hour. This would require a flow rate of the intermediate working fluid 27 of about 4.6 gallons per minute (using GALDEN® HT135). A corresponding flow rate through the condenser would be about 700 cubic feet per minute at about 3.5 inches $H_2O$ pressure (using HT-134a). This could be supplied by a condenser blower wheel operating at about 5,750 revolutions per minute. Further requirements of such a remote chiller unit 30 may be an air venting fan as well as a mechanical bypass valve.

The unchilled intermediate working fluid 27 may flow out of the heat exchanger 26 in the galley plenum 22 and be redistributed to a liquid pump 44 in at least one recirculation unit 32. The liquid pumps may supply all the force required to maintain the circulation of the intermediate working fluid through the components of the system.

Within the recirculation unit 32, the intermediate working fluid 27 may flow into an expansion tank 46. The expansion tank functions as an accumulator and a reservoir for the intermediate working fluid. The expansion tank allows for thermal expansion of the intermediate working fluid. Throughout the entire process, the intermediate working fluid may remain in the liquid state.

Each recirculation unit 32 may gather intermediate working fluid 27 from several galley air cooling units 18. Each recirculation unit may also provide intermediate working fluid to several remote chiller units 30. As an example, the flow rate through a single recirculation unit may be about 10 gallons per minute. The recirculation units may also be required to provide a pressure differential of about 100 pounds per square inch in the intermediate working fluid.

Figure 3:
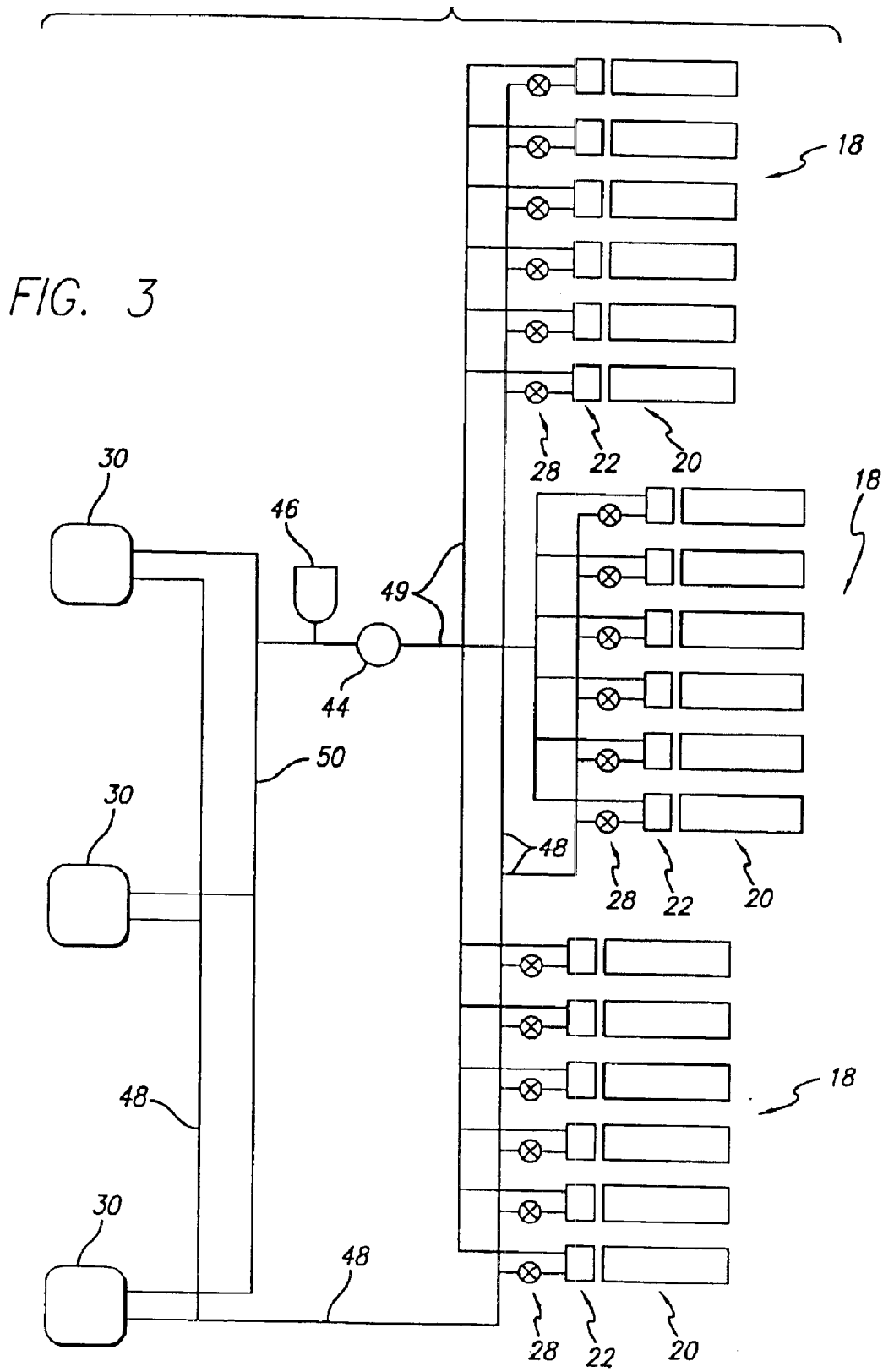
FIG. 3 is a schematic diagram of a distributed version of the galley refrigeration system for aircraft according to the invention.

To circulate the intermediate working fluid 27 throughout the distributed system, a network of ducts may connect the individual components (see FIGS. 2 and 3). Supply ducts 48 may be configured to distribute the chilled intermediate working fluid to the galley air cooling units 18. Redistribution ducts 49 may be configured to route the unchilled intermediate working fluid to the liquid pumps 44. Return ducts 50 are configured to distribute the unchilled intermediate working fluid to the remote chiller units 30.

Figures 1, 4:
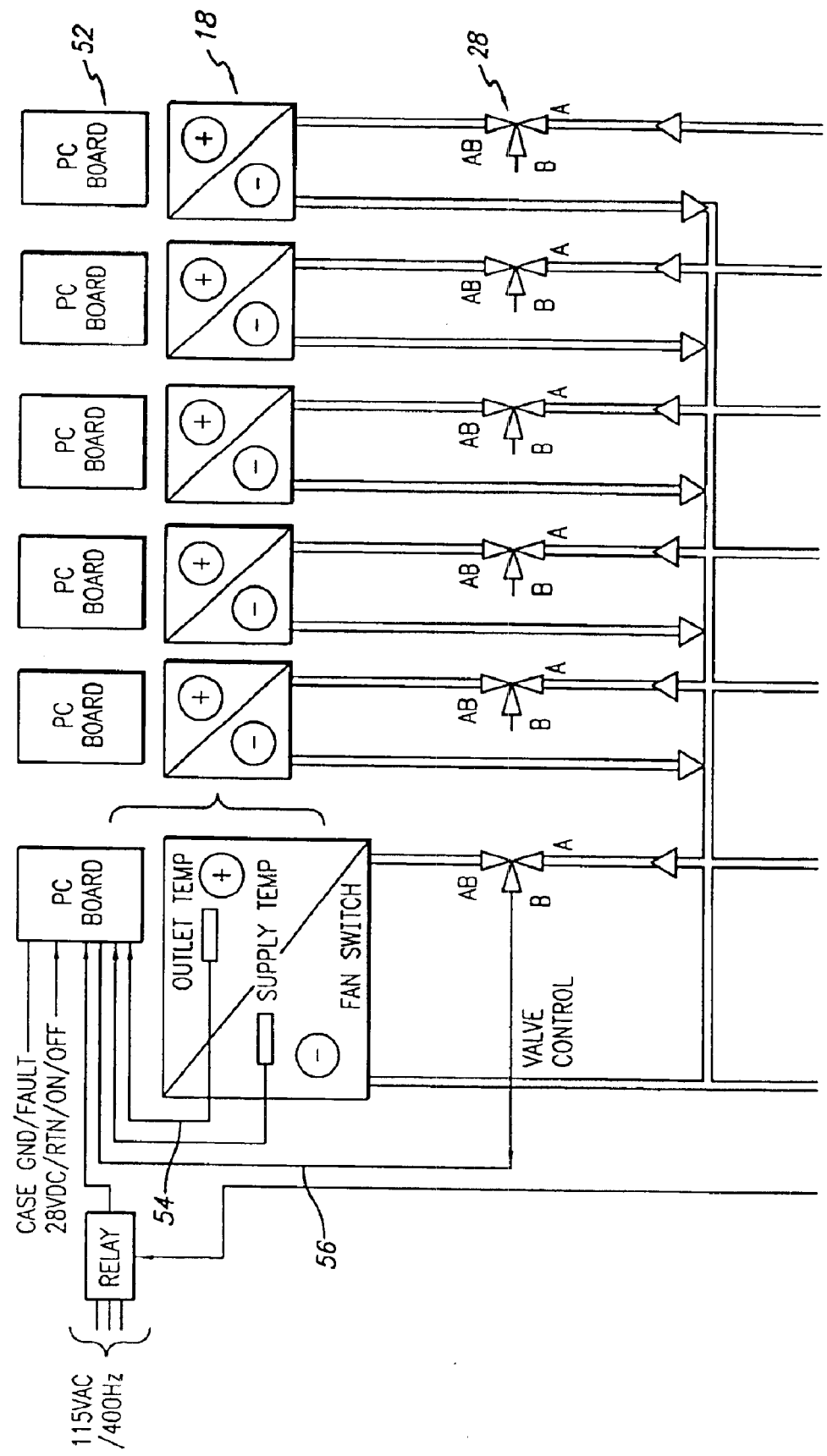
FIG. 4 is a schematic diagram of an electronic control system for controlling the galley refrigeration system for aircraft according to the invention.
Figures 2, 4:
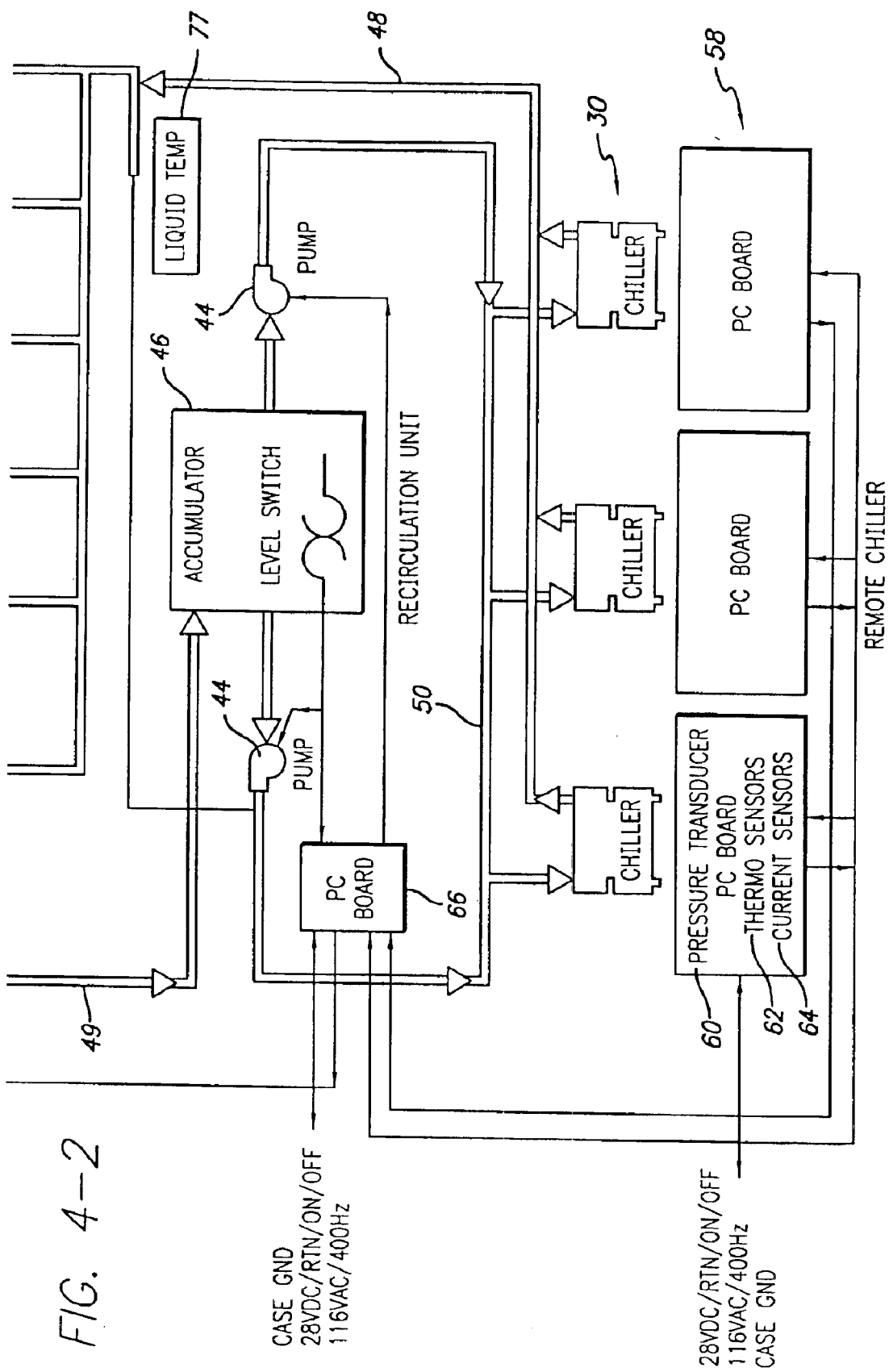

As depicted in FIG. 4, the present invention includes a comprehensive electronic system to monitor and control the distributed refrigeration system. A galley air cooling unit controller 52 may be associated with each galley air cooling unit 18. An air return temperature sensor 54 and an air supply temperature sensor 56 may each provide input to the galley air cooling unit controller. The galley air cooling unit controller may then power the fan 24 on or off as well as control the output of the coolant control valve 28.

A chiller unit monitoring device 58 may be associated with each remote chiller unit 30. By means of a pressure transducer 60, a thermo-sensor 62 and a current sensor 64, the chiller unit monitoring device may measure the function of the remote chiller unit. If needed, the chiller unit monitoring device could shut down the remote chiller unit.

A system monitoring and control device 66 may be associated with each recirculation unit 32, or may be associated with the system as a whole. The system monitoring and control device may monitor the volume and pressure within each expansion tank 46 as well as the functioning of the liquid pumps 44. Furthermore, the system monitoring device may monitor the temperature and pressure of the intermediate working fluid 27 at various locations within the system. The system monitoring and control device may also receive input from the chiller unit monitoring devices 58 and the galley air cooling unit controllers 52. With this information, the system monitoring and control device may control the functioning of each and every electronic and refrigeration component of the entire system.

Figure 5:
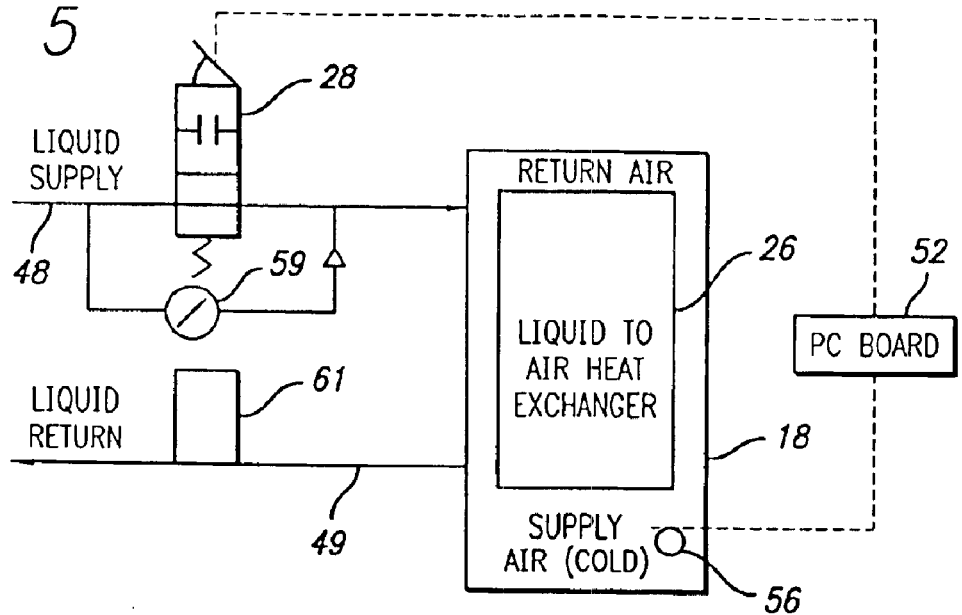
FIG. 5 is a schematic diagram of a galley air cooling unit of the galley refrigeration system for aircraft according to the invention.

As depicted in FIG. 5, the galley air cooling unit controller 52 may control the temperature of the air in the food cart 20 (FIG. 1) by regulating the flow of the intermediate working fluid 27 into the heat exchanger 26 within the galley plenum 22 (FIG. 1). The air supply temperature sensor 56 measures the temperature of the cold supply air and relays that information to the galley air cooling unit controller. In order to ensure that the cold supply air remains near a specified temperature (e.g. about −1° C. (30° F.)) the galley air cooling unit controller can increase or decrease the flow of intermediate working fluid by controlling the coolant control valve 28. As the flow of the intermediate working fluid into the heat exchanger increases, the temperature of the supply air will decrease and vice versa. The galley control device may also monitor the temperature of the intermediate working fluid at various locations or the temperature of the air returning to the heat exchanger. Furthermore, a differential pressure gauge 59 on the supply ducts 48 and a flow meter 61 on the redistribution ducts 49 may provide additional information about the flow of intermediate working fluid into and out of the galley air cooling unit 18. The galley air cooling unit controller could use this further information to more efficiently regulate the coolant control valve or to turn the fan 24 (FIG. 1) on and off.

Figure 6:
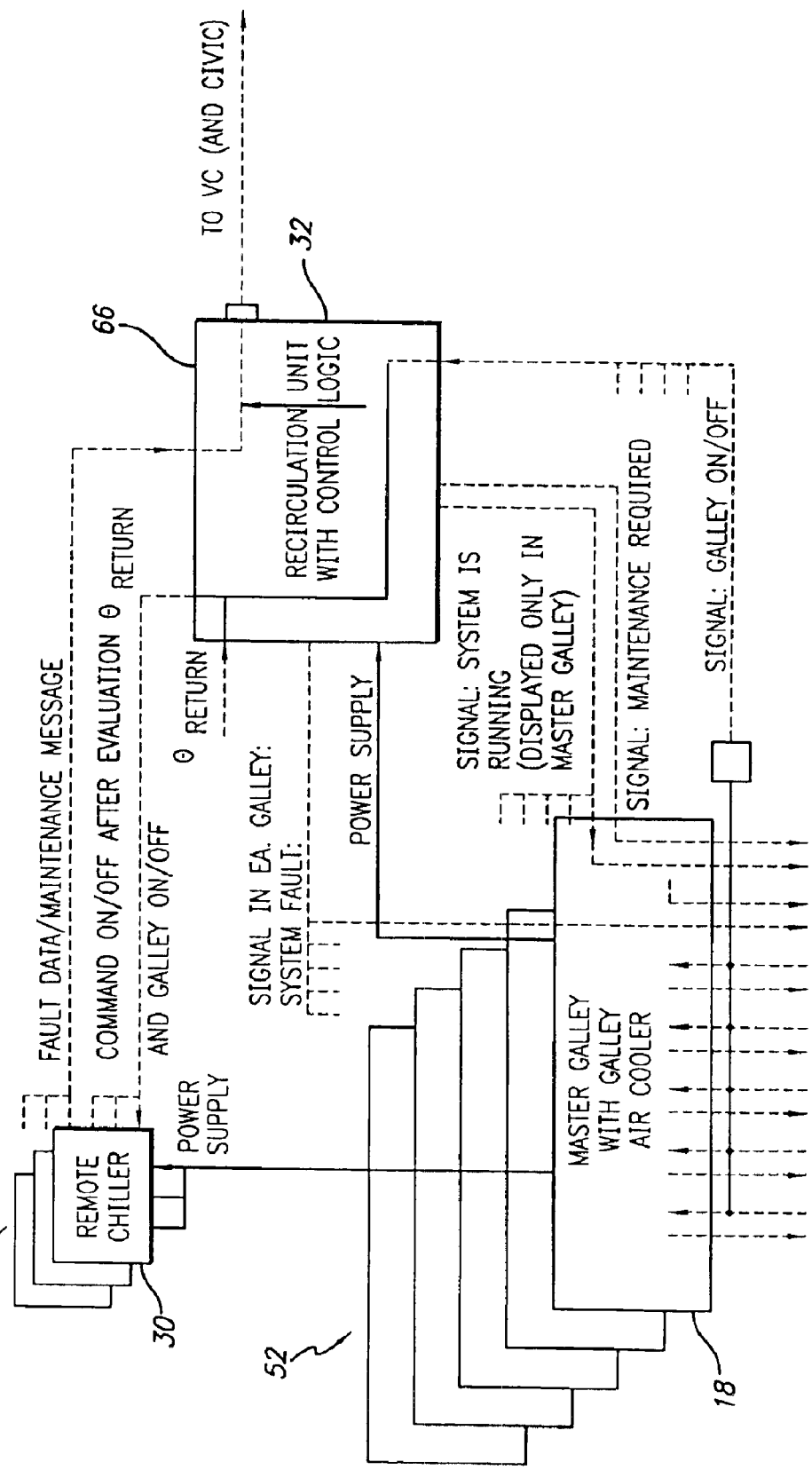
FIG. 6 is a signal block diagram of an electronic control system for controlling the galley refrigeration system for aircraft according to the invention.

As depicted in FIG. 6, the components of the electronic subsystem may be interrelated via the system monitoring and control device 66, also referred to as the recirculation unit with control logic. That is, the same electronic device used to monitor and control the recirculation unit 32 may be programmed to control the overall functioning of the entire system. This may include such functions as malfunction detection and providing maintenance information. Each galley air cooling unit controller 52 and chiller unit monitoring device 58 may be configured to send signals to the system monitoring and control device to relay information about the status of the galley air cooling units 18 and remote chiller units 30. In turn, the system monitoring and control device could send signals back to the galley air cooling unit controller and chiller unit monitoring device instructing the devices on how to control each galley air cooling unit and remote chiller unit.

Figure 7:
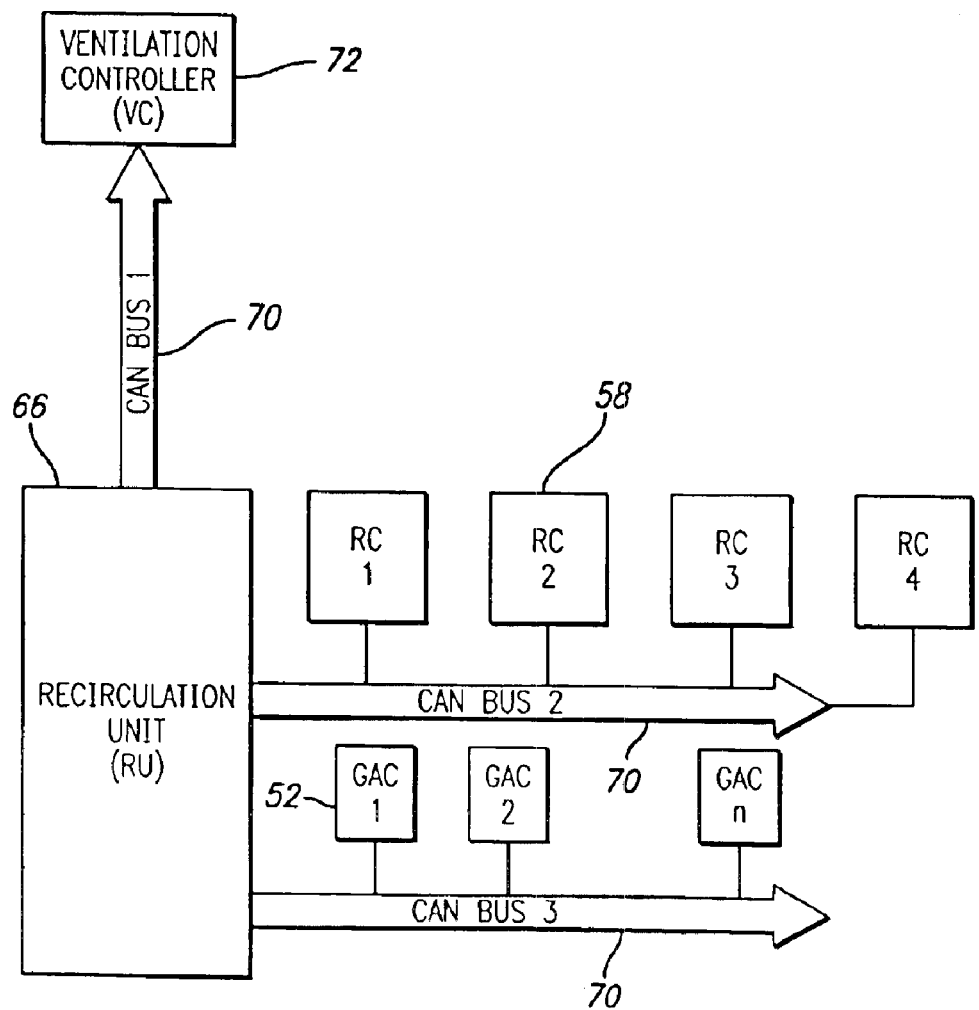
FIG. 7 is a schematic diagram depicting data communication connections between components of the galley refrigeration system.

Referring to FIG. 7, the recirculation unit control device 66 may communicate data with the remote chiller monitoring device 58 and galley air cooling unit controller 52 via a Controller Area Network bus 70 (CAN Bus) interface and additional discrete command and status lines. The recirculation unit controller may also communicate data with the aircraft ventilation controller 72 over a CAN bus interface.

The galley air cooling unit controller 52 monitors and updates various input or output discretes or conditions. For instance, an input discrete for a galley air cooling unit switch 74 (FIG. 1) may alert the control system when the switch is turned ON (with a "1") or OFF (with a "0"). The galley air cooling unit 18 may include a proximity switch 76 (FIG. 1) which indicates the presence of a food cart within the galley air cooling unit. An input discrete within the control system for the proximity switch may indicate the presence of the food cart 20 with a "1" or "TRUE" and the absence of the food cart with a "0" or "FALSE". The control system may also include a liquid refrigerant indicator 77 (FIG. 1) which indicates whether the liquid refrigerant, or intermediate working fluid 27, is sufficiently cool to regulate the air temperature within the galley air cooling unit. An input discrete within the control system for the liquid refrigerant indicator, which may be known as LiquidCool OK, may indicate with a "1" or "TRUE" when the intermediate working fluid is sufficiently cool to regulate the air temperature within the galley air cooling unit and with a "0" or "FALSE" when the intermediate working fluid is not sufficiently cool to regulate the air temperature within the galley air cooling unit.

Figures 1, 8:
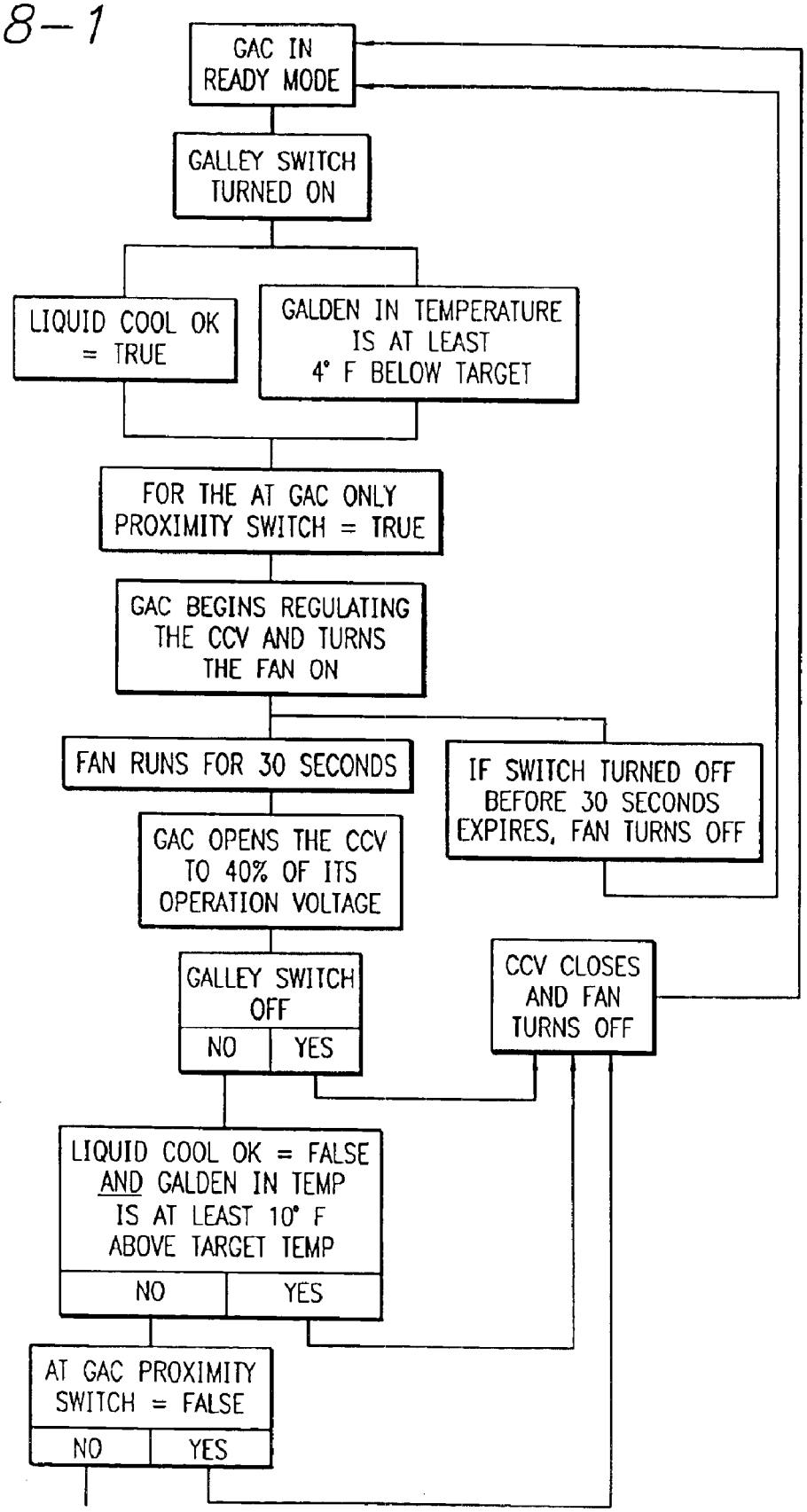
FIG. 8 is a flow chart depicting operational steps for regulating the temperature of the galley air cooling unit.
Figures 2, 8:
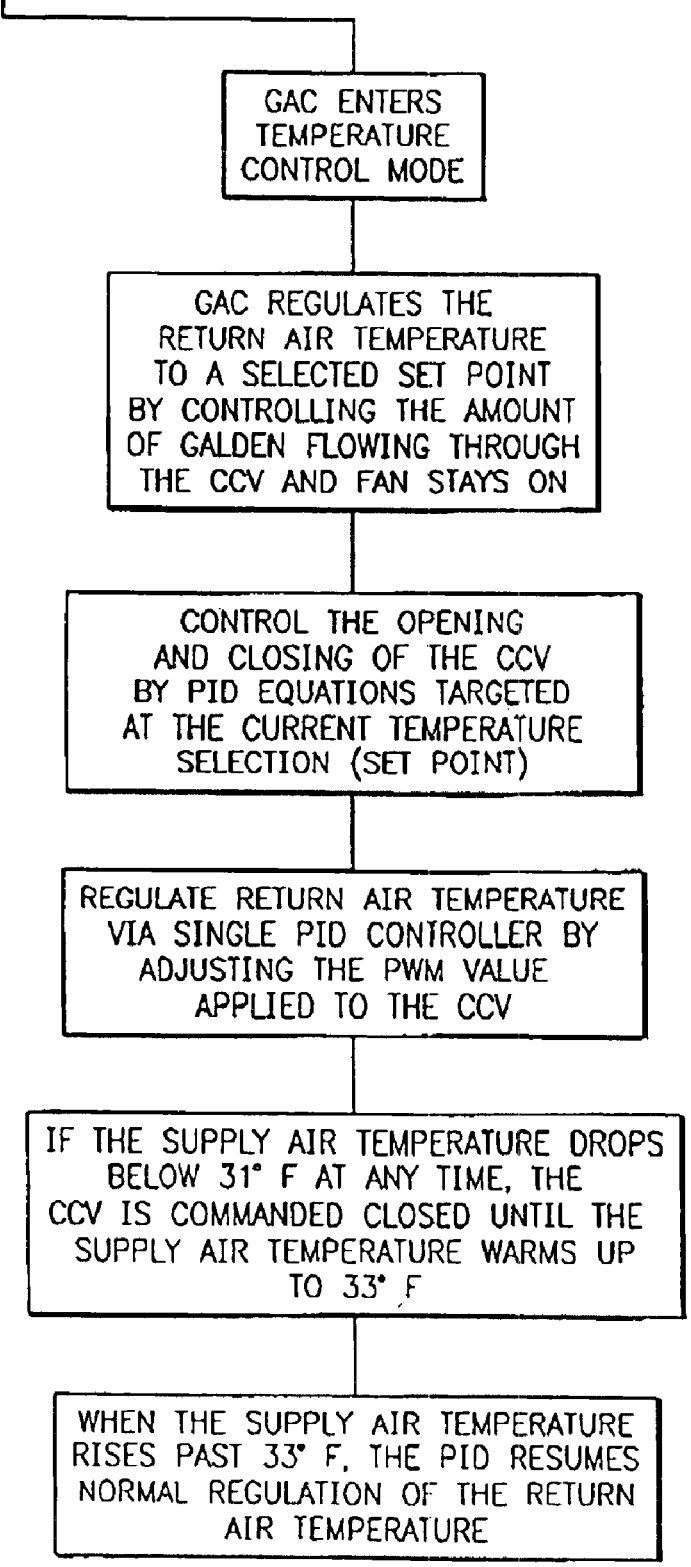

Referring to FIG. 8, the galley air cooling unit controller 52 (FIG. 4) includes software which may begin regulating the coolant control valve 28 and turn the fan 24 (FIG. 1) on if the galley air cooling unit switch 74 (FIG. 1) is ON, either the LiquidCool OK is TRUE or GALDEN® In Temperature is at least 2° C. (4° F.) below the target temperature, and, for the air-through galley air cooling unit 18 (FIG. 1) only, the proximity switch 76 (FIG. 1) is TRUE. However, the galley air cooling unit may close the coolant control valve and turn the fan off if either the galley air cooling unit switch is turned OFF, both the LiquidCool OK is FALSE and the GALDEN® In Temperature is at least 6° C. (10° F.) above the target temperature, or, for the air-through galley air cooling unit only, the proximity switch is FALSE.

To reduce the risk of water hammer as the intermediate working fluid 27 (FIG. 1) flows through the supply 48 (FIG.

4) and return 50 (FIG. 4) ducts, the coolant control valve 28 (FIG. 1) opens at a maximum rate of about 10% per second of the pulse width modulation (PWM) control range. The PWM control range may be 0–255, with "0" representing 100% of the allowable voltage and "255" representing 0% of the allowable voltage. Thus, when coupled to a 28 volt DC (28-VDC) aircraft electrical system, "0" represents 28-VDC and "255" represents 0-VDC. The PWM control range is linear, so the voltage applied during opening and closing of the valve changes 10% of the total range per second. Similarly, the valve may be opened at a maximum rate of 10% per second of the PWM control range (e.g., 0–255) to reduce the level of inrush current.

Referring again to FIG. 8, when the galley air cooling unit switch 74 (FIG. 1) is transitioned from OFF to ON, the galley air cooling unit controller 52 (FIG. 4) may turn the fan 24 (FIG. 1) on for a preset duration of time, such as about thirty seconds, to acknowledge the galley switch change to the operator of the galley air cooling unit system. If the galley air cooling unit switch is transitioned back to OFF prior the expiration of the initial preset duration of time, then the fan turns off. However, if the galley air cooling unit switch is left on, the galley air cooling unit may open the coolant control valve 28 (FIG. 1) partially, such as to about 40% of its operating voltage, following the initial preset duration of time. The coolant control valve may remain open until a mode transition occurs, such as a Temperature Control Mode. By leaving the coolant control valve open, an accurate reading of the intermediate working fluid 27 (FIG. 1) temperature may be obtained.

During Temperature Control Mode, the galley air cooling unit controller 52 (FIG. 4) may regulate the return air temperature to a selected set point by controlling the amount of intermediate working fluid 27 (FIG. 1) flowing through the coolant control valve 28 (FIG. 1). The opening and closing of the valve may be controlled via proportional integral derivative (PID) equations targeted at the current temperature selection. PID equations are used to guide a changing variable, such as temperature, towards a specified set point via a stimulus. Three separate equations adjust the stimulus to the variable (e.g., PWM value for the coolant control valve) in such a way that the variable reaches and remains at the set point in an efficient manner. The proportional component of the PID equation pushes the stimulus toward the set point by an amount proportional to the variable's deviation from the set point. The derivative component of the PID equation adjusts the stimulus by an amount proportional to the rate at which the variable is approaching its set point, thereby essentially dampening oscillations that would occur if only the proportional component of the PID equation were used. The integral component of the PID equation corrects for any biases in the system over time, such as a poorly calibrated coolant control valve.

The galley air cooling unit 18 (FIG. 1) uses a single PID controller to regulate the return air temperature by adjusting the PWM value applied to the coolant control valve 28 (FIG. 1). If the air return temperature sensor 54 fails, the galley air cooling unit controller may begin to regulate the supply air temperature to a preset bottom threshold, such as about −1° C. (31° F.). If the supply air temperature falls below the preset bottom threshold at any time, the PID controller may close the coolant control valve completely and allow the supply air temperature to increase to a preset upper temperature threshold, such as 1° C. (33° F.), before reverting back to the selected target temperature. The system then resumes regulation of the supply air temperature between the preset bottom and top temperature thresholds.

Regulation of the return air temperature may discontinue temporarily and the coolant control valve 28 (FIG. 1) may be commanded closed if the supply air temperature falls below a preset bottom temperature threshold, such as −1° C. (31° F.), at any time, even if the return air temperature is still within an operative range. In this situation, the valve is closed until the supply air temperature increases to the preset upper temperature threshold, such as, 1° C. (33° F.). When the temperature rises past the preset upper temperature threshold, the PID resumes normal regulation of the return air temperature.

In one embodiment of the invention, the coolant control valve 28 (FIG. 1) is coupled to the aircraft's electrical system which produces 28 volts DC (28-VDC). The galley air cooling unit controller 52 (FIG. 4) opens and closes the valve by controlling the amount of voltage applied to the valve. More particularly, in one embodiment of the invention, the valve opens further as the voltage level applied to the valve increases until the valve is fully open. In one embodiment of the invention, a fully closed valve does not begin to open until about 20% of the allowable voltage (e.g., 5.6-VDC) is applied to the valve, and the valve is fully opened when about 90% of the allowable voltage (e.g., 25.2-VDC) is applied to the valve. Similarly, a closing valve will be fully closed when the voltage applied to the valve is about 20% of the allowable voltage. Thus, the galley air controller 52 limits the voltage range for opening and closing the valve so that a fully open command is 90% of the allowable voltage and a fully closed command is 20% of the allowable voltage. Limiting the voltage range in this manner enhances the reaction time and performance of the PID equations.

Each time the galley air cooling unit fan is required to be turned on, the controller may randomly determine whether the fan starts immediately or after a one second delay. In this manner, about half of the fans controlled by the galley air cooling unit controller 52 (FIG. 4) will turn on immediately and the remaining fans will turn on after the one second delay, thereby decreasing the inrush current by about 50%.

Figure 9:
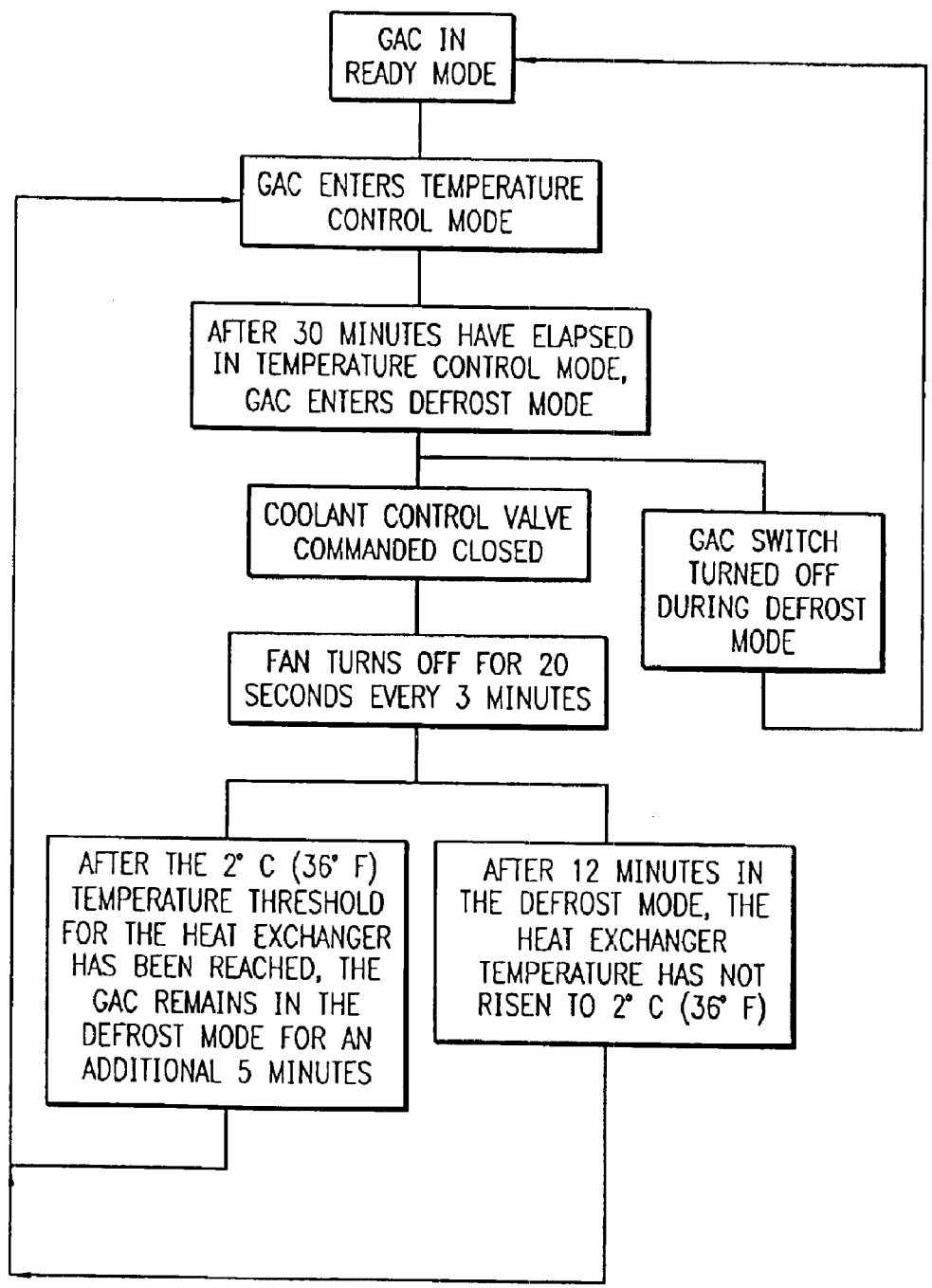
FIG. 9 is a flow chart depicting operational steps for defrosting an air-over galley air cooling unit.

The software of the galley air cooling unit controller 52 (FIG. 4) also regulates defrosting of the galley air cooling unit 18 (FIG. 1). For air-over galley air cooling units (see FIG. 9), the galley air cooling unit enters Defrost Mode after a first preset duration of time, such as about thirty minutes, has elapsed in Temperature Control Mode. During Defrost Mode, the coolant control valve 28 (FIG. 1) may be commanded closed to provide better defrost conditions. Closing the valve allows the heat exchanger 26 (FIG. 1) to warm up. In one embodiment of the invention, the galley air cooling unit may return to Temperature Control Mode at the expiration of an additional preset duration of time, such as five minutes, after the heat exchanger temperature threshold of about 2° C. (36° F.) has been reached. This is referred to as the Defrost Mode exit condition. However, if after a second preset duration of time, such as about twelve minutes, in Defrost Mode the exit condition has not been met, the galley air cooling unit 18 may return to Temperature Control Mode. During Defrost Mode, the galley air cooling unit 52 controller may turn the fan 24 (FIG. 1) off for about twenty seconds at intervals of about every three minutes to allow water to drain more efficiently from the galley air cooling unit. If the galley air cooling unit switch 74 (FIG. 1) is turned OFF during Defrost Mode, the Defrost Mode is terminated and the galley air cooling unit transitions to Ready Mode.

Figure 10:
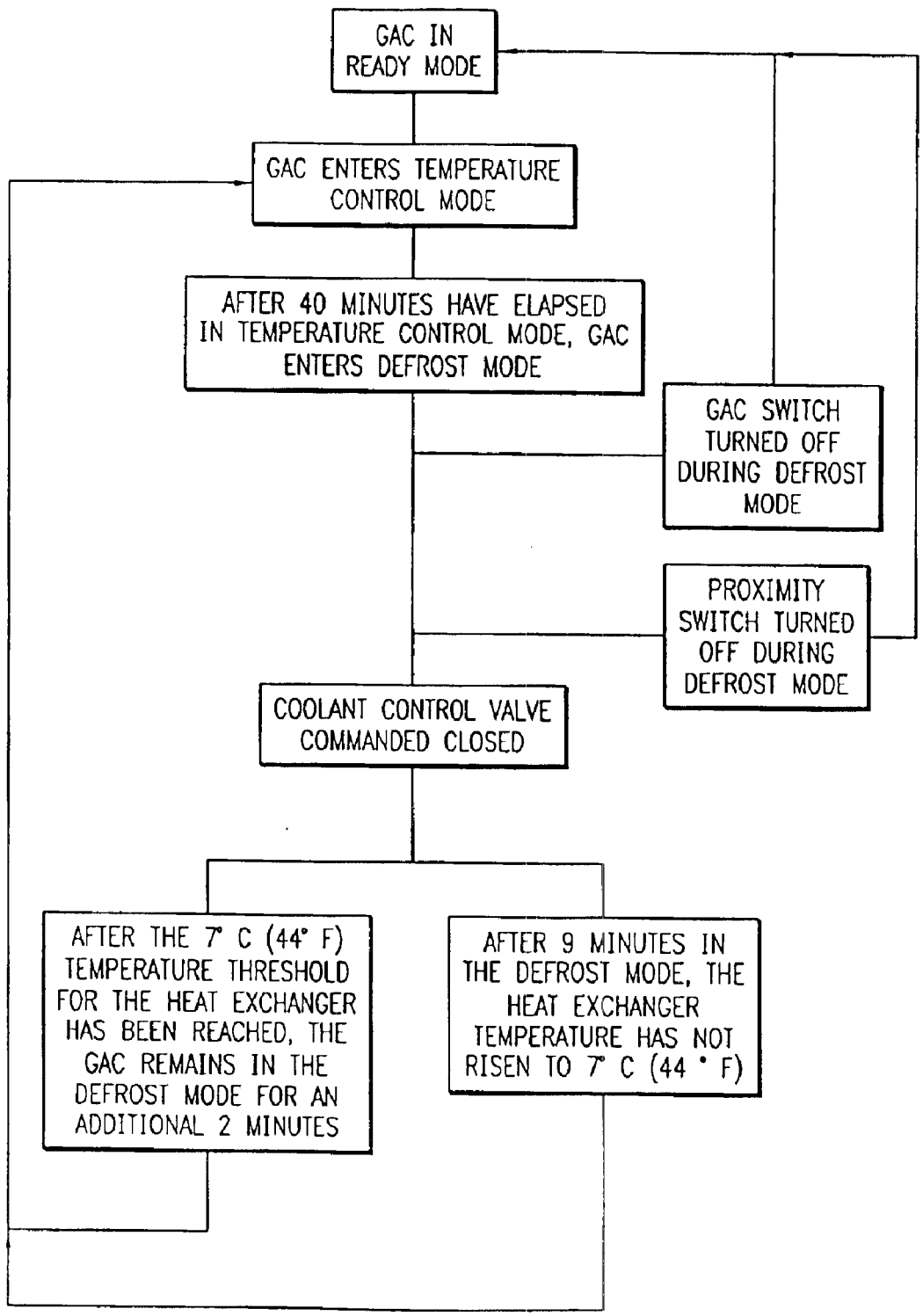
FIG. 10 is a flow chart depicting operational steps for defrosting an air-through galley air cooling unit.

For air-through galley air cooling units (see FIG. 10), the galley air cooling unit 18 (FIG. 1) enters Defrost Mode after a first duration of time, such as about forty minutes, have elapsed in Temperature Control Mode. During Defrost Mode, the coolant control valve 28 (FIG. 1) may be commanded closed to provide better defrost conditions. In one embodiment of the invention, the galley air cooling unit may return to Temperature Control Mode at the expiration of an additional duration of time, such as two minutes, after the heat exchanger 26 (FIG. 1) temperature threshold of about 7° C. (44° F.) has been reached. However, if after a second preset duration of time, such as about nine minutes, in Defrost Mode the exit condition has not been met, the galley air cooling unit may return to Temperature Control Mode. If the galley air cooling unit switch 74 (FIG. 1) is turned OFF during Defrost Mode, the Defrost Mode is terminated and the galley air cooling unit transitions to Ready Mode. Also, the Defrost Mode is terminated and the galley air cooling unit transitions to Ready Mode if the proximity switch 76 (FIG. 1) is turned OFF during Defrost Mode.

It will be apparent to those of skill in the art that the exemplary systems described in this detailed description conform to the invention described. It will also be apparent to those of skill in the art that various modifications may be made to the exemplary systems while remaining within the scope of the invention. Thus, the invention is not intended to be limited to the examples described herein. The scope of the invention is described and limited only by the following claims.

What is claimed is:

1. A method for regulating the air temperature in a food cart within an aircraft galley system, the galley system including a galley air cooling unit having the food cart and a galley plenum therein, the plenum including a heat exchanger, a fan which blows air across the heat exchanger, into the food cart via an air supply duct coupling the plenum to the food cart and back into the plenum via an air return duct coupling the food cart to the plenum, an air supply temperature sensor for measuring the temperature of the air entering the food cart from the plenum, and an air return temperature sensor for measuring the temperature of the air entering the plenum from the food cart, the method utilizing a control system for performing the steps including:

regulating the return air temperature to a selected set point by controlling the amount of a liquid refrigerant flowing through the heat exchanger via a valve;

regulating the supply air temperature if the return air temperature sensor fails, regulating the supply air temperature including, regulating the supply air temperature between a preset bottom threshold and a preset top threshold, closing the valve completely if the supply air temperature falls below the preset bottom threshold, opening the valve when the supply air temperature rises to the preset top threshold, and resuming regulation of the supply air temperature between the preset bottom threshold and the preset top threshold; and temporarily discontinuing regulation of the return air temperature if the supply air temperature drops below the preset bottom threshold, including, closing the valve completely until the supply air temperature increases to the preset top threshold, and resuming regulation of the return air temperature.

2. The method of claim 1, wherein regulating the return air temperature to a selected set point includes regulating the return air temperature to a selected set point of about 4° C. (39° F.).

3. The method of claim 1, wherein regulating the supply air temperature between a preset bottom and a preset top threshold includes regulating the supply air temperature between a preset bottom of about −1° C. (31° F.) and a preset top threshold of about 1° C. (33° F.).

4. The method of claim 1, wherein the galley air cooling unit includes a galley air cooling unit switch for turning the galley air cooling unit on, a proximity switch which indicates the presence of a food cart within the galley air cooling unit, and a liquid refrigerant indicator which indicates whether the liquid refrigerant is sufficiently cool to regulate the air temperature in the galley air cooling unit, the method further including;

regulating the valve and turning the fan on if:
the galley air cooling unit switch is ON,
the proximity switch indicates that a food cart is within the galley air cooling unit, and
either the liquid refrigerant indicator indicates that the liquid refrigerant is sufficiently coot to regulate the air temperature in the galley air cooling unit or the liquid refrigerant is at least 2° C. (4° F.) below the selected set point.

5. The method of claim 4, further including:

closing the valve and turning the fan off if any of the following conditions are met:
the galley air cooling unit switch is turned OFF,
the proximity switch indicates that there is not a food cart within the galley air cooling unit, or
both the liquid refrigerant indicator indicates that the liquid refrigerant is not sufficiently cool to regulate the air temperature in the galley, air cooling unit and the liquid refrigerant is at least 6° C. (10° F.) above the selected set point.

6. The method of claim 4, wherein turning the fan on includes randomly turning the fan on either immediately or after about a one second delay each time the fan is required to be turned on.

7. The method of claim 4, further including:

defrosting the galley air cooling unit following the expiration of a first preset duration of time when the air temperature in the galley air cooler is being regulated to the selected set point, the defrosting the galley air cooling unit including, closing the valve, leaving the valve closed for a second preset duration of time if the temperature of the heat exchanger fails to reach a preset upper temperature threshold, and leaving the valve closed for an additional duration of time after the temperature of the heat exchanger reaches the preset upper temperature threshold if the preset upper temperature threshold is reached prior to the expiration of the preset duration of time; and resuming regulation of the air temperature in the galley air cooling unit to the selected set point.

8. The method of claim 7, wherein:

defrosting the galley air cooling unit following the expiration of a first preset duration of time includes defrosting the galley air cooling unit following the expiration of about thirty minutes;

leaving the valve closed for a second preset duration of time if the temperature of the heat exchanger fails to reach a preset upper temperature threshold includes leaving the valve closed for about nine minutes if the temperature of the heat exchanger fails to reach about 2° C. (36° F.); and leaving the valve closed for an additional duration of time includes leaving the valve closed for about five minutes.

9. The method of claim 7, wherein:
defrosting the galley air cooling unit following the expiration of a first preset duration of time includes defrosting the galley air cooling unit following the expiration of about forty minutes;
leaving the valve closed for a second preset duration of time if the temperature of the heat exchanger fails to reach a preset upper temperature threshold includes leaving the valve closed for about twelve minutes if the temperature of the heat exchanger fails to reach about 7° C. (44° F.); and
leaving the valve closed for an additional duration of time includes leaving the valve closed for about two minutes.

10. The method of claim 7, wherein defrosting the galley air cooling unit further includes turning the fan off at intervals of about every three minutes for about twenty seconds during defrosting of the galley air cooling unit.

11. The method of claim 7, further including ending defrosting if the galley air cooling switch is transitioned to OFF during defrosting of the galley air cooling unit.

12. The method of claim 7, further including ending defrosting if the proximity switch indicates that there is not a food cart within the galley air cooling unit during defrosting of the galley air cooling unit.

13. The method of claim 1, wherein the galley air cooling unit includes a galley air cooling unit switch for turning the galley air cooling unit on, the method further including:
turning the fan on when the galley air cooling unit switch is transitioned to ON;
running the fan for a preset duration of time after the galley air cooling unit switch is transitioned to ON;
turning the fan off if the galley air cooling unit switch is transitioned to OFF prior to the expiration of the preset duration of time; and
opening the valve partially at the expiration of the preset duration of time if the galley air cooling unit switch remains in the ON position.

14. The method of claim 13, wherein running the fan for a preset duration of time includes running the fan for about thirty seconds.

15. The method of claim 1, wherein the valve is electronically controlled such that the valve opens further as the voltage level feeding the valve increases until the valve is fully open, the allowable voltage feeding the valve being regulated by pulse width modulation settings, the pulse width modulations having a control range, the method further including:
opening the valve at a maximum rate of about 10% per second of the pulse width modulation control range; and
closing the valve at a maximum rate of about 10% per second of the pulse width modulation control range.

16. The method of claim 15, wherein:
opening the valve to a fully open condition includes applying about 90% of the allowable voltage to the valve; and
closing the valve to a fully closed condition includes applying about 20% of the allowable voltage to the valve.

17. A method for regulating the air temperature in a food cart within an aircraft galley system, the galley system including a galley air cooling unit having the food cart and a galley plenum therein, the plenum including a heat exchanger, a valve to control the flow of a liquid refrigerant through the heat exchanger, a fan which blows air across the heat exchanger, into the food cart via an air supply duct coupling the plenum to the food cart and back into the plenum via an air return duct coupling the food cart to the plenum, an air supply temperature sensor for measuring the temperature of the air entering the food cart from the plenum, and an air return temperature sensor for measuring the temperature of the air entering the plenum from the food cart, the galley air cooling unit having a galley air cooling switch for turning the galley air cooling unit on, a proximity switch which indicates the presence of a food cart within the galley air cooling unit, and a liquid refrigerant indicator which indicates whether the liquid refrigerant is sufficiently cool to regulate the air temperature in the galley air cooling unit, the method utilizing a control system for performing the steps including:
turning the fan on when the galley air cooling unit switch is transitioned to ON;
running the fan for a preset duration of time after the galley air cooling unit switch is transitioned to ON;
turning the fan off if the galley air cooling unit switch is transitioned to OFF prior to the expiration of the preset duration of time;
opening the valve partially at the expiration of the preset duration of time if the galley air cooling unit switch remains in the ON position,
regulating the valve if,
the galley air cooling unit switch is ON,
the proximity switch indicates that a food cart is within the galley air cooling unit, and
either the liquid refrigerant indicator indicates that the liquid refrigerant is sufficiently cool to regulate the air temperature in the galley air cooling unit or the liquid refrigerant is at least 2° C. (4° F.) below the selected set point;
closing the valve and turning the fan off if any of the following conditions are met,
the galley air cooling unit switch is turned OFF,
the proximity switch indicates that there is not a food cart within the galley air cooling unit, or
both the liquid refrigerant indicator indicates that the liquid refrigerant is not sufficiently cool to regulate the air temperature in the galley air cooling unit and the liquid refrigerant is at least 6° C. (10° F.) above the selected set point;
regulating the return air temperature to a selected set point by controlling the amount of the liquid refrigerant flowing through the heat exchanger via the valve;
regulating the supply air temperature if the return air temperature sensor fails, regulating the supply air temperature including,
regulating the supply air temperature between a preset bottom threshold and a preset top threshold,
closing the valve completely if the supply air temperature falls below the preset bottom threshold,
opening the valve when the supply air temperature rises to the preset top threshold, and
resuming regulation of the supply air temperature between the preset bottom threshold and the preset top threshold; and
temporarily discontinuing regulation of the return air temperature if the supply air temperature drops below the preset bottom threshold, including,
closing the valve completely until the supply air temperature increases to the preset top threshold, and
resuming regulation of the return air temperature.

* * * * *

UNITED STATES PATENT AND TRADEMARK OFFICE
CERTIFICATE OF CORRECTION

PATENT NO. : 6,845,627 B1
DATED : January 25, 2005
INVENTOR(S) : Gilbert W. Buck It is certified that error appears in the above-identified patent and that said Letters Patent is hereby corrected as shown below:

<u>Column 3,</u>
Line 16, delete "may" and insert -- may be --.
Line 67, after "air" delete "," (comma).

<u>Column 12,</u>
Line 19, delete "coot" and insert -- cool --.
Line 30, after "galley" delete "," (comma).

Signed and Sealed this

Seventeenth Day of May, 2005

JON W. DUDAS
*Director of the United States Patent and Trademark Office*